United States Patent
Hosseini et al.

(10) Patent No.: US 11,974,276 B2
(45) Date of Patent: Apr. 30, 2024

(54) TECHNIQUES FOR SIDELINK PREEMPTION INDICATIONS IN WIRELESS COMMUNICATIONS SYSTEMS

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Wei Yang, San Diego, CA (US); Juan Montojo, San Diego, CA (US); Hwan Joon Kwon, San Diego, CA (US); Yi Huang, San Diego, CA (US); Krishna Kiran Mukkavilli, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/077,948

(22) Filed: Oct. 22, 2020

(65) Prior Publication Data

US 2022/0132484 A1    Apr. 28, 2022

(51) Int. Cl.
*H04W 72/20* (2023.01)
*H04W 72/56* (2023.01)

(52) U.S. Cl.
CPC ........... *H04W 72/20* (2023.01); *H04W 72/56* (2023.01)

(58) Field of Classification Search
CPC .................. H04W 72/0406; H04W 72/56
See application file for complete search history.

(56) References Cited

U.S. PATENT DOCUMENTS 11,284,387 B2 * 3/2022 Lin .................. H04L 5/0007
11,296,850 B2 * 4/2022 Yeo ................. H04L 27/2602
(Continued)

OTHER PUBLICATIONS

Intel Corporation: "Design of Resource Allocation Mode-2 for NR V2X Sidelink Communication," 3GPP Draft, 3GPP TSG RAN WG1 Meeting #99, R1-1912205, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823282, pp. 1-32, Retrieved from the Internet: URL: https://ftp.3gpp.org/tsg_ran/WG1_RL1/TSGR1_99/Docs/R1-1912205.zip R1-1912205 Intel—V2X_SL_M2.docx [retrieved on Nov. 9, 2019] Sensing, Resource Selection and Scheduling Windows, p. 7, paragraph 2.4.1-p. 10, Sidelink Resource Reservation / Preemption, p. 15, paragraph [02.6]-p. 16.

(Continued)

*Primary Examiner* — Won Tae C Kim
(74) *Attorney, Agent, or Firm* — Holland & Hart LLP

(57) ABSTRACT

Methods, systems, and devices for wireless communications are described. A first user equipment (UE) may receive, from a base station, control signaling indicating a set of resources of a sidelink channel available for sidelink communication with a second UE. The first UE may receive a sidelink preemption indication indicating that at least a first resource from the set of resources is preempted. The first UE may communicate a sidelink transmission over the sidelink channel with the second UE based on the sidelink preemption indication. In some cases, the first UE may determine whether the SPI satisfies one or more thresholds and the first UE may communicate the sidelink transmission, or refrain from communicating the sidelink transmission, based on determining whether the SPI satisfies the one or more thresholds.

27 Claims, 14 Drawing Sheets

(56) References Cited

U.S. PATENT DOCUMENTS

| | | | |
|---|---|---|---|
| 2019/0387377 A1* | 12/2019 | Zhang | H04W 52/383 |
| 2019/0394786 A1 | 12/2019 | Parron et al. | |
| 2020/0235848 A1* | 7/2020 | Nguyen | H04L 1/0003 |
| 2020/0413348 A1* | 12/2020 | Ryu | H04W 52/242 |
| 2021/0385822 A1* | 12/2021 | Chae | H04W 72/0446 |
| 2022/0312438 A1* | 9/2022 | Yi | H04W 72/1263 |

OTHER PUBLICATIONS

International Search Report and Written Opinion—PCT/US2021/053996—ISA/EPO—dated Feb. 1, 2022.

* cited by examiner

TECHNIQUES FOR SIDELINK PREEMPTION INDICATIONS IN WIRELESS COMMUNICATIONS SYSTEMS

FIELD OF TECHNOLOGY

The following relates to wireless communications, including techniques for sidelink preemption indications in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, UEs may communicate with one or more base stations using an access link (e.g., via a Uu interface in a 4G or 5G system). Further, some UEs may communicate directly with one or more other UEs using a sidelink (e.g., a PC5 interface), such that the UEs communicate directly rather than through a base station for some communications. In some cases, sidelink communications may interfere with communications via the access link, which may result in relatively inefficient communications, poor reliability, or both.

SUMMARY

The described techniques relate to improved methods, systems, devices, and apparatuses that support techniques for sidelink preemption indications in wireless communications systems. Generally, the described techniques enable one or more devices in a wireless communications system to implement sidelink preemption indications, which may result in enhanced efficiency, reliability, and latency of a network, among other advantages. For example, a base station may configure resources for sidelink communications between user equipments (UEs) in the system (e.g., a PC5 interface) in addition or alternative to resources for an access link (e.g., a Uu interface) for uplink or downlink communications. For example, the base station may transmit control signaling indicating a set of resources of a sidelink channel for sidelink communications between UEs. In some examples, the set of resources may be shared resources (e.g., sidelink communications and Uu communications may be on a same carrier).

The base station may transmit a sidelink preemption indication indicating a subset of resources from the set of resources is preempted. For example, a UE may receive the sidelink preemption indication and communicate sidelink transmissions based on the sidelink preemption indication (e.g., the UE may refrain from using the subset of resources for sidelink communications). In some examples, the sidelink preemption indication may be sent periodically or a-periodically, the sidelink preemption indication may be transmitted via resources dedicated to preemption indication signaling, the sidelink preemption indication may correspond to one or more resource pools for a serving cell or one or more serving cells, or any combination thereof. The sidelink preemption indication may indicate one or more types of information, such as the preempted resources, a priority, a power threshold, a zone identifier (ID), a periodicity, a resource pool ID, a carrier ID, a cast type, or any combination thereof.

DETAILED DESCRIPTION

Figure 1:
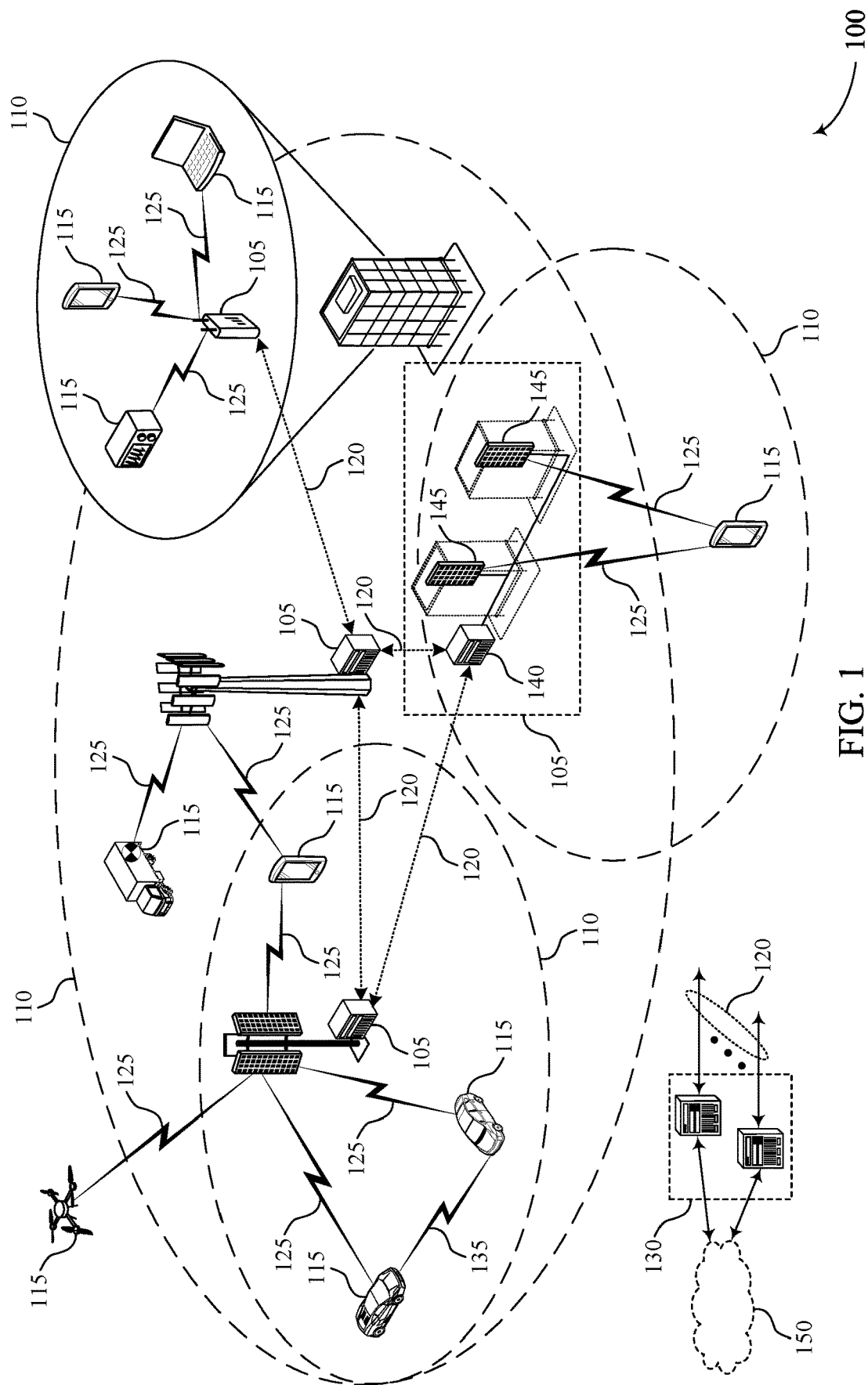
FIG. 1 illustrates an example of a system for wireless communications that supports techniques for sidelink preemption indications in wireless communications systems in accordance with aspects of the present disclosure.

Some wireless communications systems may support both access links and sidelinks. An access link is a communication link between a user equipment (UE) and a base station. In some examples, an access link may be referred to as a Uu interface. Specifically, the Uu interface may refer to an over-the-air interface for downlink transmissions, uplink transmissions, or both. A sidelink is a communication link between similar devices and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples) between multiple base stations (e.g., in an integrated access and backhaul (IAB) deployment), or between other types of wireless communications devices. It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one wireless device to one or more other similar wireless devices.

In some cases, a base station may configure a set of resources for use in sidelink communications between UEs. For example, the base station may configure resources (e.g., periodic resources) that may be used for physical sidelink shared channel (PSSCH), physical sidelink control channel (PSCCH), and physical sidelink feedback channel (PSFCH) communications between UEs, among other examples of sidelink communications. Additionally or alternatively, the base station may configure an access link (e.g., a Uu interface) for uplink or downlink communications with one or more of the UEs. In some examples, such resources may be shared resources (e.g., the configured sidelink resources may overlap with the configured access link resources). For example, the access link resources and the sidelink resources may be configured on a same carrier.

In accordance with various aspects discussed herein, devices of a wireless communications system may implement techniques for sidelink preemption indications (SPIs). For example, a base station may configure resources for sidelink communications and access link communications for one or more UEs. The base station may determine to preempt a portion of the sidelink resources. For example, a relatively high priority communication with a first UE using an access link (e.g., a communication via the Uu interface) may be scheduled by the base station. The base station may preempt the resources corresponding to the communication with the first UE. For instance, the base station may transmit an SPI to one or more UEs in the system (e.g., the base station may directly communicate the SPI to UEs or the SPI may be relayed to UEs) and the SPI may indicate the preempted resources, which may reduce a likelihood of interference with the relatively high priority communication, among other advantages.

As an illustrative example, a UE may receive the SPI and communicate sidelink transmissions based on the SPI. In some examples, the SPI may be sent periodically or a-periodically, the SPI may be transmitted via resources dedicated to preemption indication signaling, the SPI may correspond to one or more resource pools for a serving cell or one or more serving cells, or any combination thereof. The sidelink preemption indication may indicate one or more types of information. For example, the SPI may include parameters indicating the preempted resources, a priority of the SPI, a power threshold (e.g., a reference signal receive power (RSRP), a zone identifier (ID), a periodicity of the SPI, a duration of time that the SPI is valid, a resource pool ID, a carrier ID, a cast type, or any combination thereof.

The UE may communicate with the base station and/or other UEs based on the parameters of the SPI. For example, the UE may determine whether one or more thresholds are satisfied by the parameters of the SPI. In some examples, the UE may refrain from communicating over the subset of sidelink resources based on whether the one or more thresholds are satisfied (e.g., a priority of the SPI may be greater than a priority of a sidelink communication of the UE, a zone ID may correspond to a zone of the UE, a RSRP of the SPI may be less than a threshold, etc.), which may result in reduced interference in the communications system, among other advantages. In some examples, the UE may determine to proceed with communications over resources that overlap with the subset of resources based on whether the one or more thresholds are satisfied (e.g., a RSRP of the SPI may be greater than a threshold, a zone ID of the SPI may be different than the zone including the UE, etc.), which may result in increased communications efficiency in the system while ensuring reliable communications, among other advantages.

Aspects of the disclosure are initially described in the context of wireless communications systems. Aspects of the disclosure are further illustrated by and described with reference to process flows, apparatus diagrams, system diagrams, and flowcharts that relate to techniques for sidelink preemption indications in wireless communications systems.

FIG. 1 illustrates an example of a wireless communications system 100 that supports techniques for sidelink preemption indications in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, multiple UEs 115 may implement sidelink communications for direct UE-to-UE exchange of information. Such UEs 115, in accordance with various described techniques, may monitor for a SPI from a base station 105 and determine whether one or more sidelink communications is preempted based on the SPI (e.g., if reserved resources of a sidelink channel are indicated as being preempted by the SPI).

For example, a base station 105 may configure resources for sidelink communications between UEs 115 in the system (e.g., a PC5 interface) in addition or alternative to resources for an access link (e.g., a Uu interface) for uplink or downlink communications. For example, the base station 105 may transmit control signaling indicating a set of resources of a sidelink channel for sidelink communications between UEs. In some examples, the set of resources may be shared resources (e.g., sidelink communications and Uu communications may be on a same carrier). The base station 105 may transmit a sidelink preemption indication indicating a subset of resources from the set of resources is preempted. For example, a UE 115 may receive the sidelink preemption indication and communicate sidelink transmissions based on the sidelink preemption indication (e.g., the UE 115 may refrain from using the subset of resources for sidelink communications or the UE 115 may communicate over the subset of resources based on one or more parameters of the SPI satisfying one or more thresholds). In some examples, the sidelink preemption indication may be sent periodically or a-periodically, the sidelink preemption indication may be transmitted via resources dedicated to preemption indication signaling, the sidelink preemption indication may correspond to one or more resource pools for a serving cell or one or more serving cells, or any combination thereof. The sidelink preemption indication may indicate one or more types of information, such as the preempted resources, a priority, a power threshold, a zone identifier (ID), a periodicity, a resource pool ID, a carrier ID, a cast type, or any combination thereof.

Figure 2:
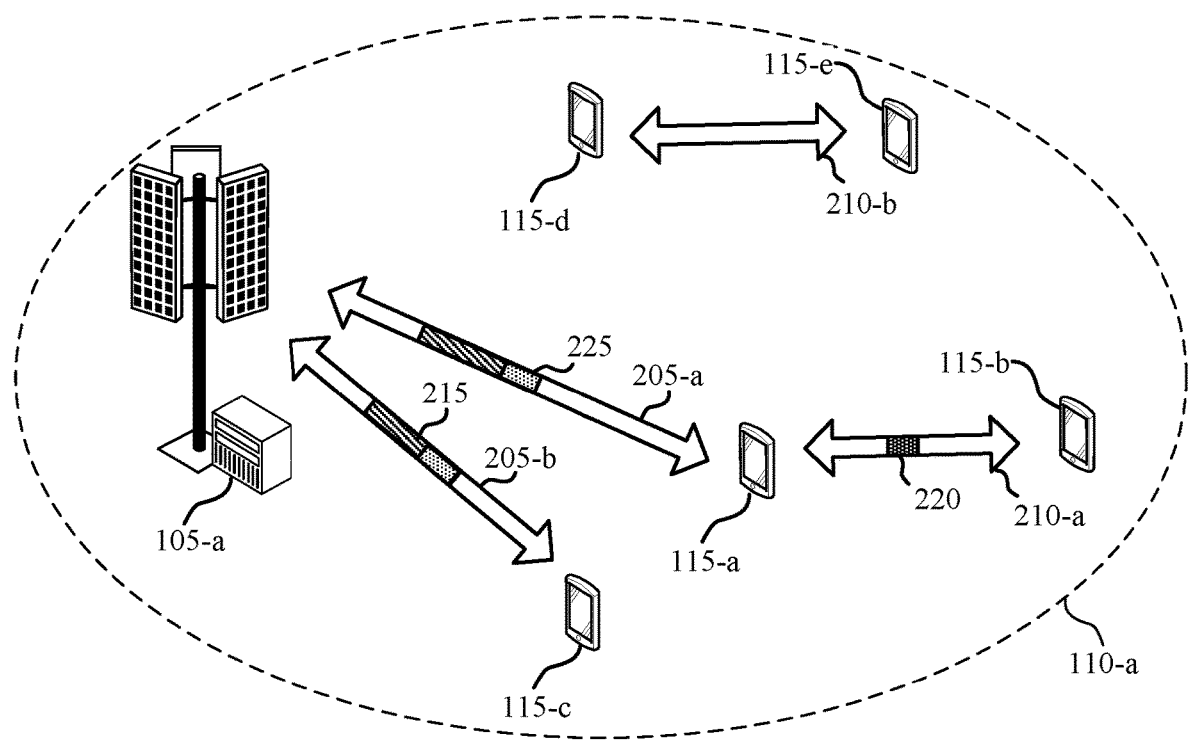
FIG. 2 illustrates an example of a wireless communications system that supports techniques for sidelink preemption indications in wireless communications systems in accordance with aspects of the present disclosure.

FIG. 2 illustrates an example of a wireless communications system 200 that supports techniques for sidelink preemption indications in wireless communications systems in accordance with aspects of the present disclosure. In some examples, the wireless communications system 200 may implement aspects of wireless communications system 100. For example, the wireless communications system 200 may include a base station 105-*a*, UE 115-*a*, UE 115-*b*, UE 115-*c*, UE 115-*d*, and UE 115-*e*, which may be examples of a base station 105 and UEs 115, respectively, described with reference to FIG. 1. In some cases, the base station 105-*a* may communicate with one or more UEs 115 using access link communications 215 via an access link 205. In some cases, the UEs 115 may communicate with each other (e.g., within a V2X system, a D2D system, and the like) using sidelink communications 220 via a sidelink 210. Generally, the wireless communications system 200 may illustrate example implementations of one or more sidelink preemption indications 225 as described herein.

One or more of the UEs 115 may be in a coverage area 110-*a* (e.g., a coverage area 110 with reference to FIG. 1) of the base station 105-*a*. Additionally or alternatively, one or more of the UEs 115 may be outside of the coverage area 110-*a*. As illustrative examples, the UE 115-*a* and the UE 115-*c* may communicate with the base station 105-*a* via a respective access link (e.g., access link 205-*a* and 205-*b*, respectively). The UE 115-*a* and the UE 115-*b* may communicate via a sidelink 210-*a*, and the UE 115-*d* and the UE 115-*e* may communicate via a sidelink 210-*b*. It is noted that the example of FIG. 2 is provided for purposes of discussion and illustration, and numerous other deployments are possible, such as cases where communications between the base station 105-*a* and one or more UEs 115 are relayed through another UE 115 (e.g., relayed using a sidelink 210 when a UE 115 is outside of coverage area 110-*a*) or another wireless relay node, cases where additional UEs 115 are present, cases where other types of UEs 115 or relays are present (e.g., roadside units in a V2X system), cases where UEs 115 are deployed in a factory automation or other industrial setting, cases where the communications and indications from some devices are implemented in other devices (e.g., the sidelink preemption indication may be generated and/or transmitted from a relay node or a UE 115 rather than the base station 105-*a*), or any combinations thereof, to name but a few examples. Techniques as discussed herein may be used in any such deployments.

Sidelink communications 220 may be configured to operate using one or more modes, such as a first mode with dynamic scheduling (e.g., mode 1 using downlink control information (DCI) format 3_0), the first mode with configured resources for transmission (e.g., both type-1 and type-2 may be supported), a second mode (e.g., mode 2) with sensing and reservation of the resources without control of the base station 105-*a* (e.g., the UEs 115 may co-ordinate resource reservations amongst each other without the base station 105-*a*), or any combination thereof. The techniques described herein may relate to the first mode, the second mode, or both, among other examples of modes for communications. As one example, the techniques described herein may enable a base station 105-*a* (e.g., a gNB) to control sidelink activities for in-coverage UEs operating with mode 2 resource allocation, among other examples.

In some examples, the devices in the wireless communications system 200 may multiplex Uu and sidelink transmissions. In some examples, the base station 105-*a* may not include resource sharing between access link communications 215 and sidelink communications 220 (e.g., semi-static splitting of resources between access links 205 and sidelinks 210. In some other examples, the base station 105-*a* may implement resource sharing (e.g., soft resource sharing). The wireless communications system 200 may support techniques to enhance such multiplexing of Uu and SL operations, for example, on a licensed carrier for non-V2X or commercial use cases, among other examples of use cases (e.g., any use case for wireless communications in which resource sharing between Uu and SL may be implemented).

Sidelink communications 220 may occur on resources shared with access link communications 215 (e.g., sidelink communications 220 may utilize uplink symbols, such as full uplink slots or a full uplink portion of flexible slots, among other examples). In other words, access link communications 215 (e.g., uplink communications or downlink communications) may use a shared set of resources as sidelink communications 220. For example, the resources for the sidelinks 210 and access links 205 may overlap (e.g., the base station 105-a may allocate resources of a carrier for sidelink via a resource pool configuration in addition to supporting Uu communications on resources of the carrier). As one illustrative example, uplink symbols may potentially be used for sidelink communications 220 (e.g., the UEs 115 may be configured with a sidelink resource pool that overlaps with at least a portion of the uplink resources). Additionally or alternatively, downlink symbols may be potentially used for sidelink communications 220 (e.g., the UEs 115 may be configured with a sidelink resource pool that overlaps with at least a portion of the downlink resources). In some cases, power control techniques may be used for such resource sharing (e.g., a power control configuration may be adjusted semi-statically to account for downlink or sidelink pathloss for open loop power control (OLPC)). For example, UEs 115 may receive a dynamic indication of whether sidelink pathloss or downlink pathloss is to be used to determine a transmit power, among other examples of parameters (e.g., the UE 115 can be indicated to increase a power if there is no overlapping Uu transmission for a sidelink transmission, indicated parameters for power transmission can, for example, be tied to a priority of the sidelink transmission, the base station 105-a may transmit a OLPC indication for mode 2 sidelink UEs or a zone based OLPC parameter indication, etc.).

In accordance with the techniques described herein, the wireless communications system 200 may be enabled with SPIs 225, which may result in reduced interference between communications on shared resources. For example, the base station 105-a may be able to control sidelink activities via the SPI 225, for example, to preempt resources for an uplink transmission or a downlink transmission from a UE 115-c, which may reduce the chance of sidelink communications 220 interfering with Uu uplink or downlink communications (e.g., access link communications 215).

As an illustrative example, the base station 105-a may configure one or more UEs 115 for sidelink communications 220. For instance, the base station 105-a may transmit configuration information (e.g., control signaling on the access link 205) indicating wireless resources that are allocated for the sidelink communications 220 between the UE 115-a, the UE 115-b, the UE 115-d, and the UE 115-e (e.g., PSSCH resources). In some cases, the configuration information may configure the UEs 115 to operate with Mode 1 resource allocation in which the network allocates resources for each UE 115 (e.g., in dynamic scheduling using DCI format 3_0, or with a configured pool of resources), or with Mode 2 resource allocation in which the UEs 115 select sidelink resources from a sidelink resource pool using sensing and reservation techniques to identify resources without direct control of the base station 105-a. For example, wireless devices (e.g., UEs 115, base stations 105, or other wireless devices) may perform sensing or prioritization procedures (e.g., using sidelink resource allocation Mode 2 or a variant) and the wireless devices may select sidelink resources based on the sensing and prioritization procedures. In some such examples, if resources are preempted (e.g., a UE 115 receives a sidelink preemption indication indicating the preempted resources), the UE 115 may trigger a resource re-selection procedure, for example, if the UE 115 has scheduled communications via the preempted resources. Additionally or alternatively, the UE 115 may perform an availability check prior to starting an initial transmission of a transport block. For example, the UE 115 may determine whether the resources for the initial transmission are available based on any sidelink preemption indication messages, among other examples.

In some cases, sidelink resources may be allocated in resources that are otherwise available for uplink communications on access links 205-a and 205-b (e.g., in uplink symbols of the Uu interface). In other cases, sidelink resources may also be allocated in flexible resources, downlink resources, or both, of the access links 205-a and 205-b (e.g., in flexible or downlink symbols of the Uu interface). In some cases, on a given carrier, the base station 105-a may allocate some resources for sidelink via a resource pool configuration, and also support some Uu users on the carrier.

In some examples, the base station 105-a may determine that high priority access link communications 215 (e.g., URLLC or mission critical data) with the UE 115-c are scheduled with resources that may overlap with the configured sidelink resources. That is, allocated resources for an access link communication 215 with the UE 115-c may potentially collide with one or more sidelink communications 220 transmitted via the allocated resources. In order to reduce or avoid interference between traffic on the sidelinks 210 and the access links 205-b, the base station 105-a may transmit an SPI 225 to one or more UEs 115. In some examples, the SPI 225 may be transmitted in DCI on a PDCCH, and may alternatively or additionally be transmitted in a broadcast transmission from the base station 105-a (e.g., on a physical broadcast channel (PBCH)).

For example, the UE 115-a, the UE 115-b, the UE 115-d, the UE 115-e, or a combination thereof may receive the SPI 225. One or more of the UEs 115 may preempt one or more sidelink transmissions in accordance with one or more parameters of the SPI 225, which may, for example, reduce interference with the scheduled relatively high priority access link communications 215 between the base station 105-a and the UE 115-c. Such preemption techniques may provide the base station 105-a with flexibility in scheduling sidelink resources as well as in allocating access link resources for some communications, such as high priority communications. By providing sufficient sidelink resources, the first UE 115-a and second UE 115-b, and any other sidelink UEs 115, may exchange data in an efficient manner with relatively high reliability and low latency relative to cases where the base station 105-a may be constrained in the amount of sidelink resources that may be granted. Further, reliability may be increased and latency may be decreased for the high priority access link communications 215, through the ability of the base station 105-a to schedule such communications using resources that may collide with the allocated sidelink resources (e.g., the SPI 225 may enable the base station 105-a to reclaim, for an access link communication 215, potential resources such as slots or sub-channels available for sidelink communications 220).

In some examples, the SPI 225 may be generated and sent by the base station 105-a, for example, if a target UE 115 (e.g., a sidelink transmission user) is in coverage. In some examples, the SPI 225 may be relayed to such target UEs 115 and/or the indication may be generated by a relay node. The SPI 225 may be sent periodically (e.g., via periodic resources, such as scheduled resources with a configured periodicity) or aperiodically (e.g., via dynamically allocated resources). In some examples, a set of resources may be configured for preemption indication signaling (e.g., known sub-channels of a resource pool may be configured for preemption indication signaling, a dedicated resource pool for the preemption indication signaling may be configured, one or more carriers may be configured for monitoring for sidelink preemption indicators, or any combination thereof). For example, the UE 115-*d* may monitor the configured set of resources for an SPI 225 and receive the SPI 225 based on the monitoring. The SPI 225 may correspond to a respective resource pool or may be applied to a set of resource pools on a respective serving cell. For example, the base station 105-*a* may dynamically indicate one or more resource pools for the SPI 225, and the UEs 115 may apply the SPI 225 (e.g., communicate or refrain from communicating via indicated preempted resources of the SPI 225) to the indicated one or more resource pools and/or one or more sidelink carriers. Additionally or alternatively, the UEs 115 may be pre-configured to apply the SPI 225 to one or more resource pools. In some examples, the SPI 225 may correspond to a respective serving cell or may be applied to a set of one or more serving cells (e.g., the one or more serving cells associated with the SPI 225 may be dynamically indicated or preconfigured).

The SPI 225 may indicate one or more types of information (e.g., the SPI 225 may include parameters indicating the one or more types of information). For example, the SPI 225 may indicate time-frequency resources for preemption. That is, a UE 115 (e.g., the UE 115-*a*) may receive the SPI 225 and preempt the indicated time-frequency resources (e.g., refrain from transmitting sidelink communications 220 if the communication will use the time-frequency resources), for example, based on determining whether one or more thresholds are satisfied as described herein. In some examples, the SPI 225 may include a sequence of bits where each bit maps to a set of slots and/or a set of sub-channels for preemption (e.g., the mapped set of slots and/or set of sub-channels may be scheduled for a relatively high priority access link communication 215 with the UE 115-*c*).

In some examples, the SPI 225 may be associated with a priority. For example, a quantity of bits in the SPI 225 may indicate the priority of the SPI 225 (e.g., dynamic indication of the priority). As an illustrative example, the UE 115-*a* may identify a priority threshold of the SPI 225 (e.g., the indicated priority of the SPI 225). If the UE 115-*a* determines that a sidelink transmission to the UE 115-*b* overlaps with the indicated resources, and that the priority of the sidelink transmission is lower than the priority threshold of the SPI 225, the UE 115-*a* may preempt the resources. Additionally or alternatively, the priority threshold may be configured (e.g., pre-configured via control signaling) for a respective carrier or resource pool. In some examples, the priority threshold may be configured via a common configuration. For example, a base station or another wireless device may indicate a common configuration for a resource pool or carrier (e.g., UEs 115 active on the resource pool or carrier will follow the common configuration). Additionally or alternatively, the base station or another wireless device may indicate a UE specific configuration (e.g., the configurations may be UE specific and for each resource pool or carrier). In some examples, the SPI 225 may include a bit in the payload indicating whether sidelink transmissions with a priority that satisfies the configured priority threshold should be preempted (e.g., the UE 115-*a* may receive the bit and preempt a sidelink transmission with a priority lower than the pre-configured priority threshold). Such dynamic priority implementations may enable more flexible scheduling and priority control at the base station 105-*a*, among other advantages.

In some examples, one or more UEs 115 may be configured in one or more priority modes. For example, the UE 115-*a* may be configured to apply the SPI 225 regardless of a priority of the sidelink transmission using the preempted resources (e.g., the UE 115-*a* may refrain from communicating a sidelink transmission of any priority via resources indicated by the SPI 225). As another example, the UE 115-*a* may be configured to apply the SPI 225 if the packet priority of a sidelink transmission (e.g., to the UE 115-*b*) satisfies a priority threshold. For instance, the priority threshold may be configured on a per-UE basis (e.g., the UE 115-*a* and the UE 115-*d* may be configured with different priority thresholds), on a per-resource pool basis, a per-serving cell basis, or any combination thereof. Such modes may result in reduced dynamic signaling overhead, among other advantages.

The UEs 115 may determine whether one or more thresholds are satisfied based on receiving the SPI 225. Such UEs 115 may determine whether to apply (e.g., follow) or ignore the received SPI 225 based on whether the thresholds are satisfied (e.g., whether a priority of a sidelink transmission satisfies the priority threshold for the SPI 225). As an illustrative example, the UE 115-*d* and the UE 115-*a* may determine respective measurements, such as RSRP measurements, on the signal carrying the SPI 225. The UE 115-*d* may compare the RSRP measurement to a RSRP threshold and determine whether to preempt the resources indicated by the SPI 225 based on whether the RSRP threshold is satisfied. For example, the UE 115-*d* may determine that the measured RSRP is greater than a threshold, and the UE 115-*d* may preempt the indicated resources. As another example, the UE 115-*a* may determine that a respective measured RSRP is less than the RSRP threshold and may transmit sidelink communications 220 based on the determination. Additionally or alternatively, in order to reduce interference to neighboring cells, the UE 115-*a* may consider applying the SPI 225 (e.g., preempting the indicated resources) when a measured RSRP on the access link 205-*a* is smaller than a RSRP threshold. Such techniques may enable UEs 115 that are relatively closer to the cell center to apply the SPI 225 to reduce interference, while UEs 115 that are relatively distant or unlikely to interfere with the access link communication 215 may maintain sidelink communications 220 (e.g., refrain from applying the SPI 225), which may increase system efficiency and reduce latency, among other advantages.

In some examples, the RSRP threshold may be indicated via a quantity of bits in the payload of the SPI 225, or could be configured (e.g., pre-configured) on a per-UE, per-resource pool, or per-serving cell basis. Additionally or alternatively, the RSRP threshold may be determined based on a corresponding transmission packet priority, or a corresponding pair of sidelink packets and the priority indicated by the SPI 225.

The SPI 225 may indicate a zone ID. For example, the SPI 225 may include a parameter indicating one or more zone IDs for which the SPI 225 is to be applied. A UE 115 may determine that a zone ID where the UE 115 is located satisfies a threshold (e.g., matches an indicated zone ID in the SPI 225) and the UE 115 may apply the SPI 225. Such techniques may enable a base station 105-*a* to select zones for preempting resources based on a location of a respective access link communication 215 (e.g., if the base station 105-*a* is aware of the location of the Uu user, such as the UE 115-*c*, the base station can preempt resources in the same zone or neighboring zones).

The base station 105-*a* may indicate a periodicity for the SPI 225. For example, the indicated resources may be used for access link communications in a periodic matter (e.g., the resources may be repeated with a periodicity) and each periodic instance of the indicated resource may need to be preempted by sidelink UEs. Thus, the base station 105-*a* may indicate a periodicity for the SPI 225 explicitly (e.g., the SPI 225 may indicate a quantity of periods that the resources are to be preempted) or by other methods. For example, the UE 115-*a* may initiate a timer upon receiving an SPI 225. The UE 115-*a* may apply the SPI 225 for the indicated resources (i.e., the SPI 225 may be valid) until an expiration of the timer or until a new SPI 225 is received. The UE 115-*a* may reset the timer upon reception of a new SPI 225. Upon expiration of the timer, the UE 115-*a* may determine that the indicated resources of the SPI 225 are available for sidelink communications 220.

The SPI 225 may indicate a resource pool ID, a carrier ID, or any combination thereof. For example, the base station 105-*a* may configure multiple resource pools on a serving cell. The base station 105-*a* may attempt to reclaim a subset of resource pools for an access link communication 215, and the base station 105-*a* may indicate the subset of resource pools (e.g., one or more resource pool IDs) in the SPI 225.

The SPI 225 may indicate a cast type. For example, the SPI 225 may indicate whether the preemption is associated with unicast transmissions, groupcast transmissions, broadcast transmissions, or a combination thereof. In some examples, such an indication may be dynamic. For example, one or more bits in the SPI 225 or another message may indicate the cast type. Additionally or alternatively, the cast type may be pre-configured for one or more UEs 115. For example, the cast type associated with SPIs 225 may be configured (e.g., via control signaling or pre-configured at the UE 115) on a per-UE basis, a per-resource pool basis, a per-carrier basis, or a combination thereof.

Figure 3:
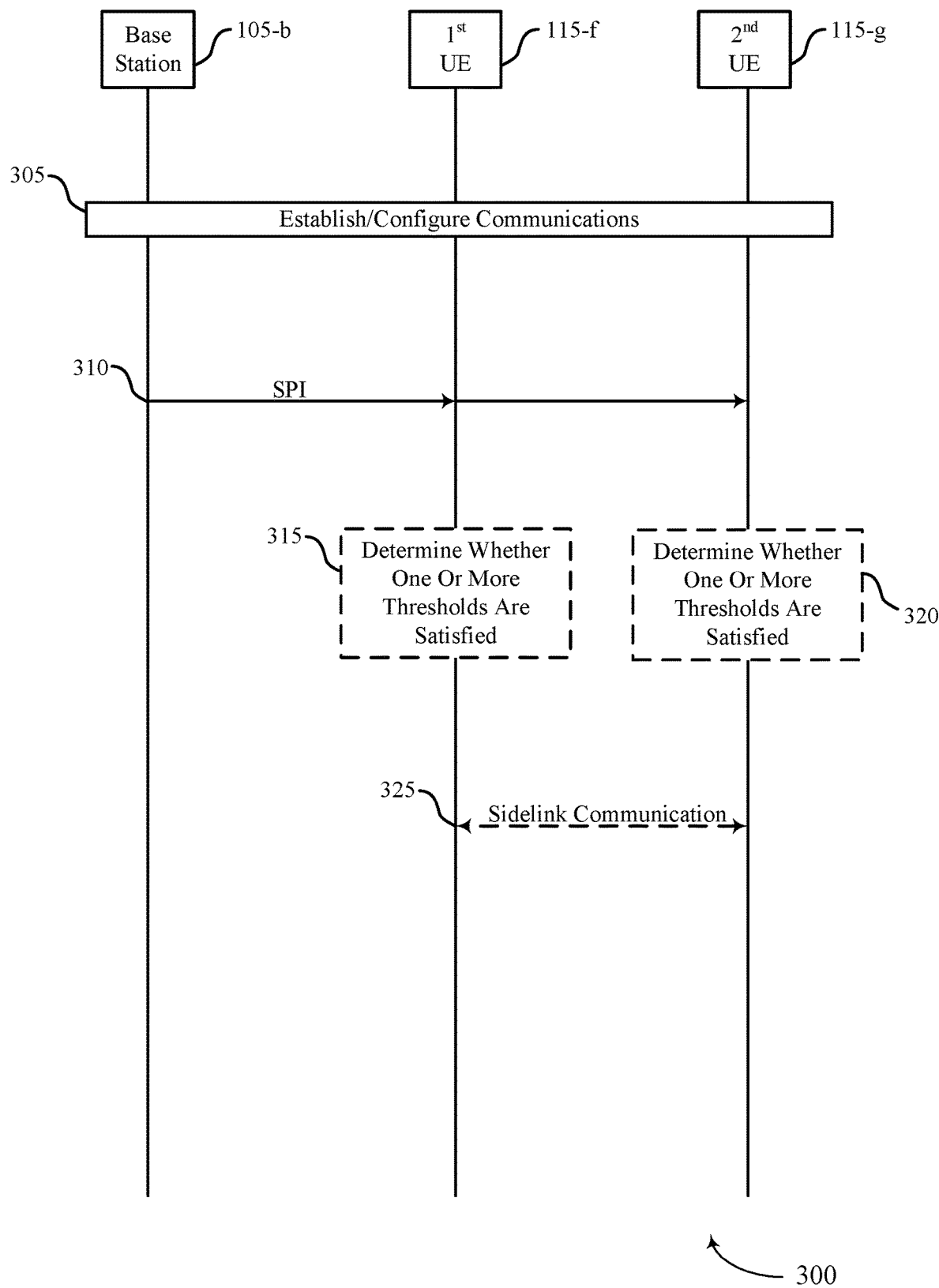
FIG. 3 illustrates an example of a process flow that supports techniques for sidelink preemption indications in wireless communications systems in accordance with aspects of the present disclosure.

FIG. 3 illustrates an example of a process flow 300 that supports techniques for sidelink preemption indications in wireless communications systems in accordance with aspects of the present disclosure. In some examples, the process flow 300 may implement aspects of wireless communications system 100 or 200. For example, process flow 300 may be implemented by a first UE 115-*f*, a second UE 115-*g*, and a serving base station 105-*b*, which may be examples of UEs 115 and base stations 105 as described herein. Alternative examples of the following may be implemented, where some steps are performed in a different order than described or are not performed at all. In some cases, steps may include additional features not mentioned below, or further steps may be added.

At 305, the first UE 115-*f*, the second UE 115-*g*, the base station 105-*b*, or any combination thereof may establish and configure a communications connection. In some examples, the base station 105-*b* may configure the first UE 115-*f* and the second UE 115-*g* with a sidelink communications connection. For example, the base station 105-*b* may transmit control signaling indicating a set of resources of a sidelink channel for the sidelink communications, as described with reference to FIG. 2.

At 310, the base station 105-*b* may transmit a SPI to the first UE 115-*f*, the second UE 115-*g*, or both. For example, the base station 105-*b* may identify a first resource of the set of resources that is preempted (e.g., a relatively high priority communication between another UE 115 and the base station 105-*b* may be scheduled for the first resource and the base station 105-*b* may preempt the resource). The base station 105-*b* may transmit the SPI to one or both of the UEs 115, as described herein with reference to FIG. 2. Additionally or alternatively, another wireless device may generate or transmit the SPI. For example, the second UE 115-*g* or another UE 115 may send the SPI (e.g., a relay), the second UE 115-*g* or another UE 115 may generate the SPI, or any combination thereof, among other examples of wireless devices.

In some examples, at 315 the first UE 115-*f* may determine whether one or more thresholds are satisfied based on receiving the SPI. For example, the first UE 115-*f* may determine whether one or more parameters associated with the SPI satisfy the one or more thresholds, and the first UE 115-*f* may apply or refrain from applying the SPI based on the determination, as described herein with reference to FIG. 2. Additionally or alternatively, at 320 the second UE 115-*g* may determine whether one or more thresholds are satisfied based on receiving the SPI.

In some examples, at 325 the first UE 115-*f* and the second UE 115-*g* may transmit or receive sidelink communications based on receiving the SPI and/or determining whether the one or more threshold are satisfied. For example, the first UE 115-*f* may communicate with the second UE 115-*g* using different resources than the first resource indicated by the SPI, or the first UE 115-*f* may communicate with the second UE 115-*g* using the first resource (e.g., based on the one or more thresholds failing to be satisfied), as described herein with reference to FIG. 2.

Figure 4:
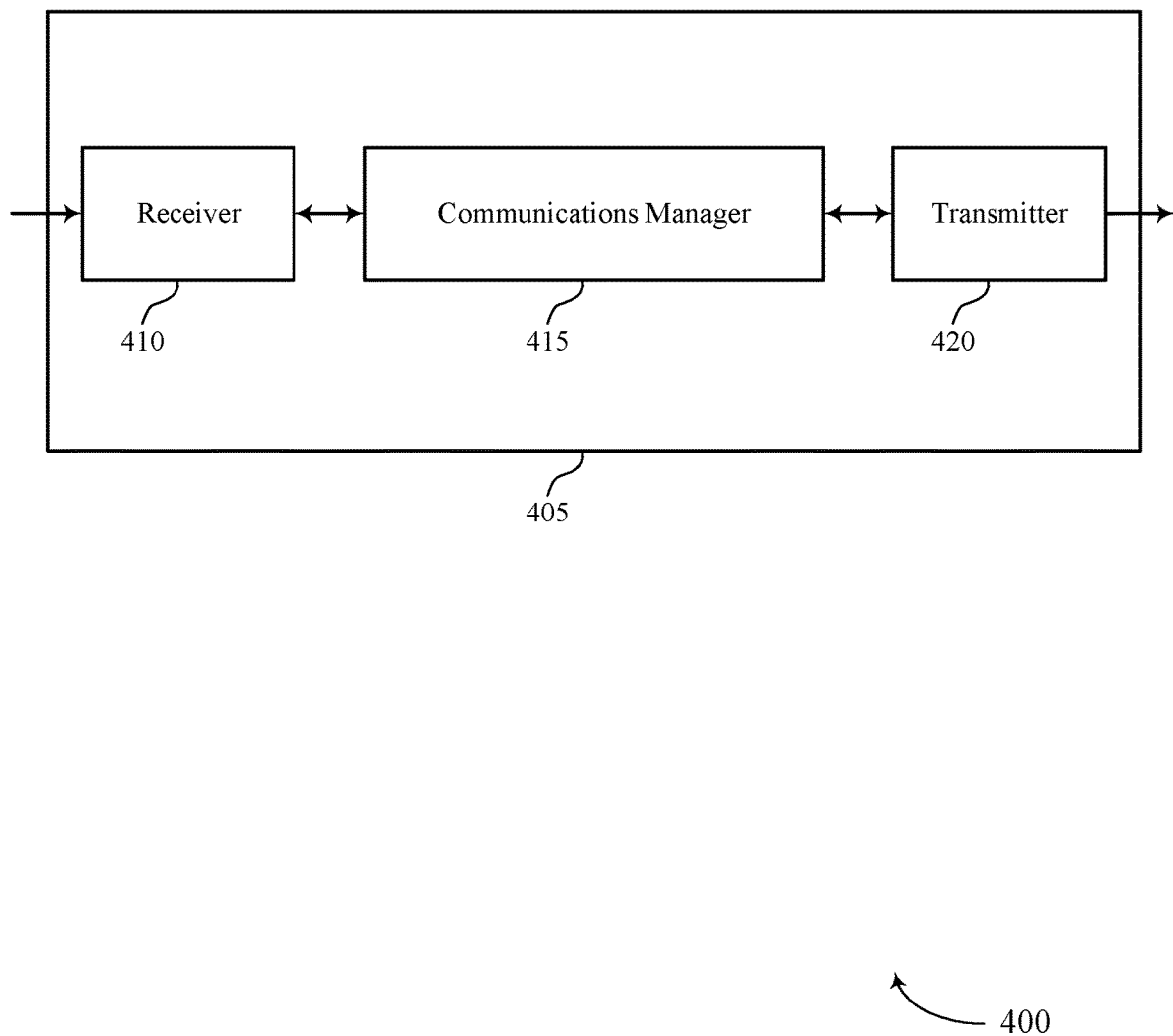
FIGS. 4 and 5 show block diagrams of devices that support techniques for sidelink preemption indications in wireless communications systems in accordance with aspects of the present disclosure.

FIG. 4 shows a block diagram 400 of a device 405 that supports techniques for sidelink preemption indications in wireless communications systems in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for sidelink preemption indications in wireless communications systems, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, control signaling indicating a set of resources of a sidelink channel available for sidelink communication with a second UE, receive a sidelink preemption indication indicating that at least a first resource from the set of resources is preempted, and communicate a sidelink transmission over the sidelink channel with the second UE based on the sidelink preemption indication. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 415 as described herein may be implemented to realize one or more potential advantages. One implementation may allow the device 405 to determine preemption for one or more sidelink communications. Such operations may provide improvements to reliability and efficiency in communications for a system that supports both access links and sidelinks, among other examples of systems. Such improvements may enhance efficiency of wireless communications at a UE by allowing for flexible allocation of sidelink resources with configurable preemption in the event of other communications that may collide with the sidelink resources. As such, supported techniques may include improved network and UE operations and, in some examples, may promote network efficiencies, reduce latency, and provide network scheduling flexibility, among other benefits.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
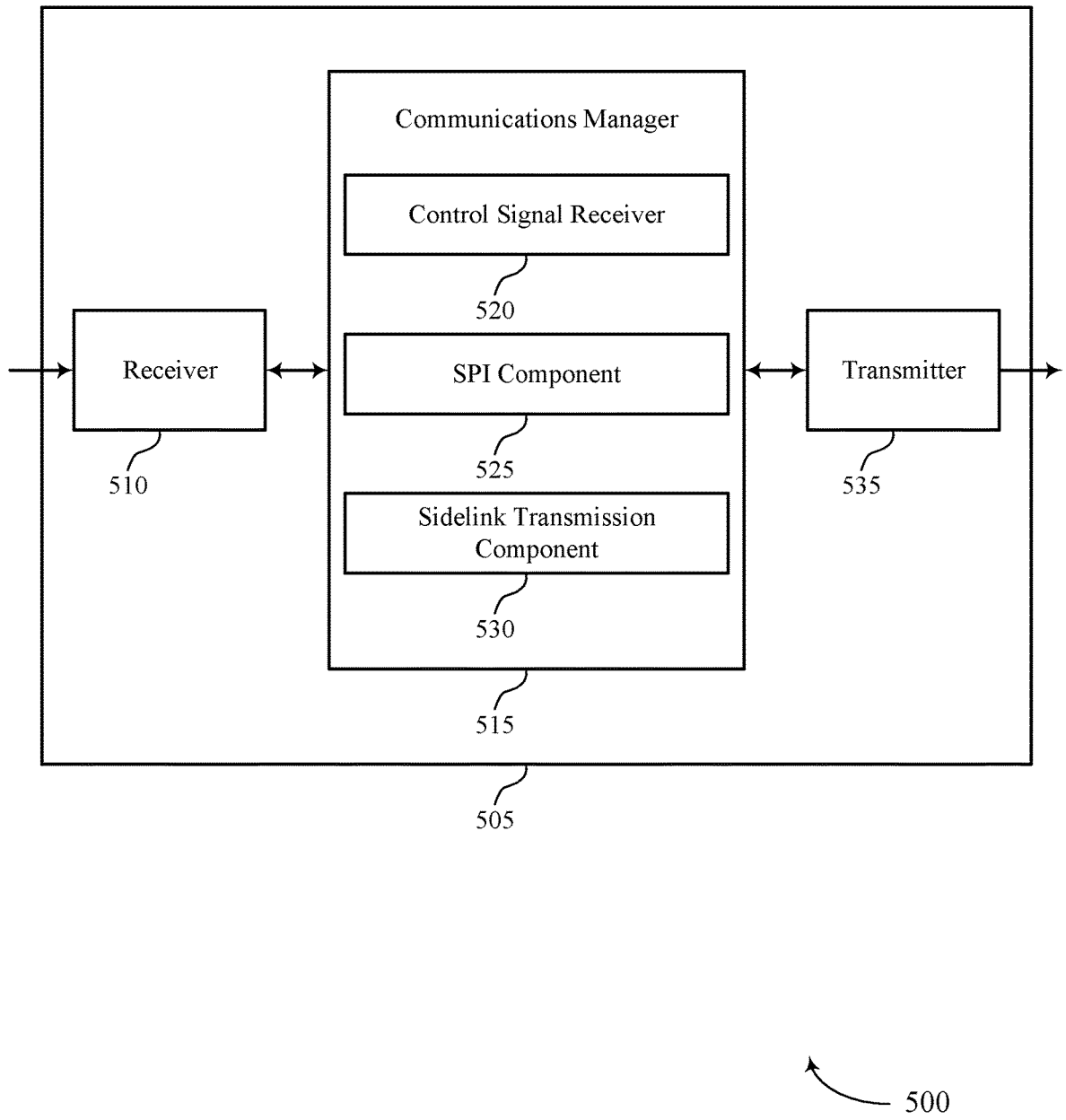

FIG. 5 shows a block diagram 500 of a device 505 that supports techniques for sidelink preemption indications in wireless communications systems in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for sidelink preemption indications in wireless communications systems, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control signal receiver 520, a SPI component 525, and a sidelink transmission component 530. The communications manager 515 may be an example of aspects of the communications manager 710 described herein.

The control signal receiver 520 may receive, from a base station, control signaling indicating a set of resources of a sidelink channel available for sidelink communication with a second UE.

The SPI component 525 may receive a sidelink preemption indication indicating that at least a first resource from the set of resources is preempted.

The sidelink transmission component 530 may communicate a sidelink transmission over the sidelink channel with the second UE based on the sidelink preemption indication.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
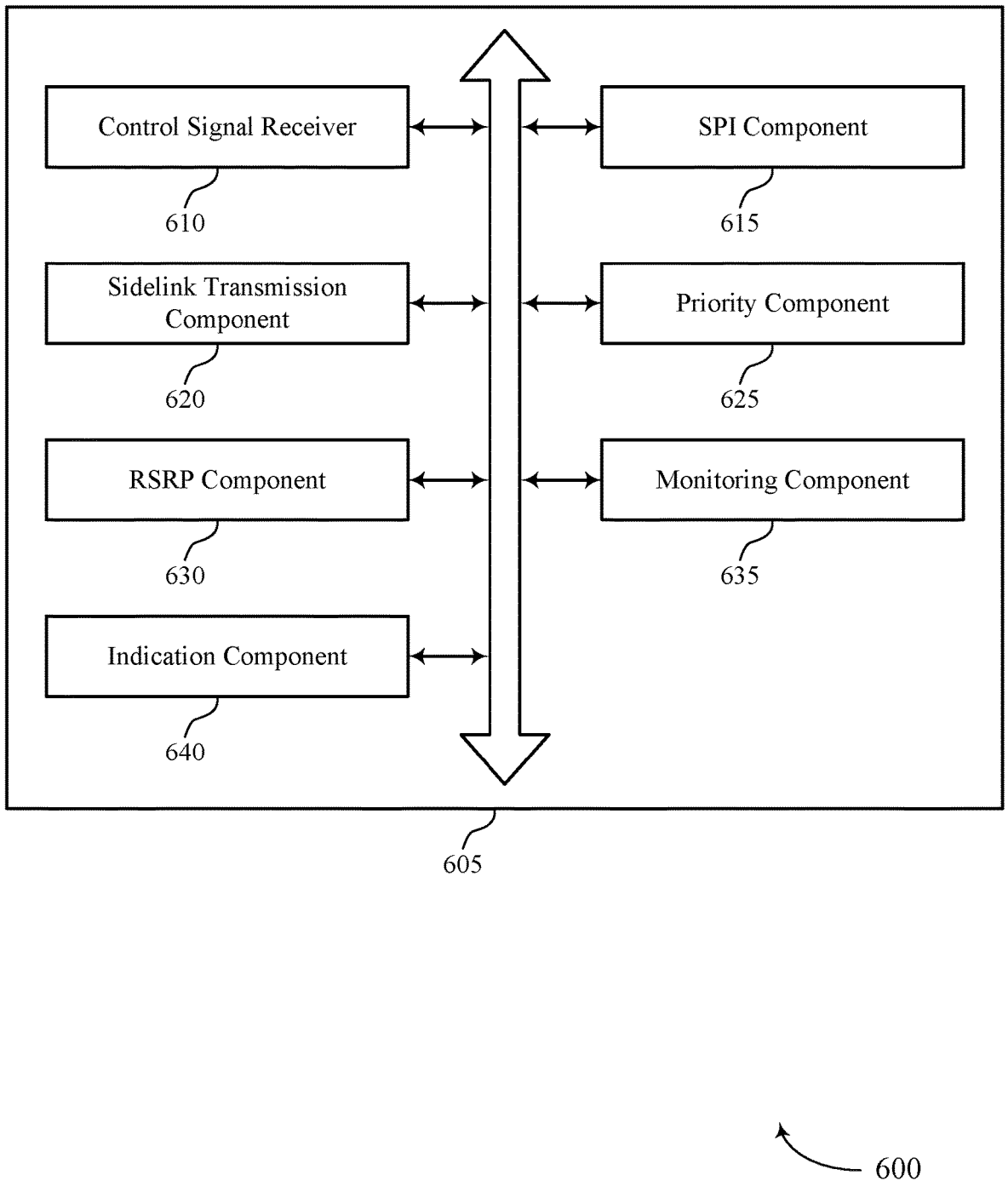
FIG. 6 shows a block diagram of a communications manager that supports techniques for sidelink preemption indications in wireless communications systems in accordance with aspects of the present disclosure.

FIG. 6 shows a block diagram 600 of a communications manager 605 that supports techniques for sidelink preemption indications in wireless communications systems in accordance with aspects of the present disclosure. The communications manager 605 may be an example of aspects of a communications manager 415, a communications manager 515, or a communications manager 710 described herein. The communications manager 605 may include a control signal receiver 610, a SPI component 615, a sidelink transmission component 620, a priority component 625, a RSRP component 630, a monitoring component 635, and an indication component 640. Each of these modules may communicate, directly or indirectly, with one another (e.g., via one or more buses).

The control signal receiver 610 may receive, from a base station, control signaling indicating a set of resources of a sidelink channel available for sidelink communication with a second UE.

The SPI component 615 may receive a sidelink preemption indication indicating that at least a first resource from the set of resources is preempted. In some examples, the SPI component 615 may receive the sidelink preemption indication that indicates the priority threshold. In some examples, the SPI component 615 may receive the sidelink preemption indication that indicates the threshold.

In some examples, the SPI component 615 may receive the sidelink preemption indication that indicates a zone identifier, a resource pool identifier, a carrier identifier, a periodicity of preemption, a cast type, or any combination thereof. In some examples, the SPI component 615 may receive the sidelink preemption indication periodically, a-periodically, or a combination thereof.

In some examples, the SPI component 615 may receive the sidelink preemption indication that corresponds to a first resource pool or a set of resource pools, the first resource pool or the set of resource pools including the set of resources. In some examples, the SPI component 615 may receive the sidelink preemption indication that corresponds to a first serving cell, a set of serving cells including the first serving cell, or a combination thereof.

The sidelink transmission component 620 may communicate a sidelink transmission over the sidelink channel with the second UE based on the sidelink preemption indication.

The priority component 625 may identify a priority threshold associated with the sidelink preemption indication. In some examples, the priority component 625 may determine that a priority of the sidelink transmission satisfies the priority threshold, where communicating the sidelink transmission over the sidelink channel is based on the priority of the sidelink transmission satisfying the priority threshold. In some cases, the priority threshold is configured at the UE for a carrier, a resource pool including the set of resources, or a combination thereof. In some cases, the priority threshold is configured by a common configuration for a carrier or a resource pool including the set of resources, the common configuration associated with a plurality of UEs that are active on the carrier or the resource pool The RSRP component 630 may identify a reference signal received power measurement based on receiving the sidelink preemption indication. In some examples, the RSRP component 630 may determine that the reference signal received power measurement satisfies a threshold, where communicating the sidelink transmission over the sidelink channel is based on the reference signal received power measurement satisfying the threshold. In some examples, the RSRP component 630 may identify the threshold based on a priority of the sidelink transmission, the priority of the sidelink transmission indicated by the sidelink preemption indication.

The monitoring component 635 may monitor a second set of resources for the sidelink preemption indication, where receiving the sidelink preemption indication is based on the monitoring, the second set of resources including different resources than the set of resources, a subset of the set of resources, or a combination thereof.

The indication component 640 may receive an indication that the sidelink preemption indication corresponds to the first serving cell or the set of serving cells.

Figure 7:
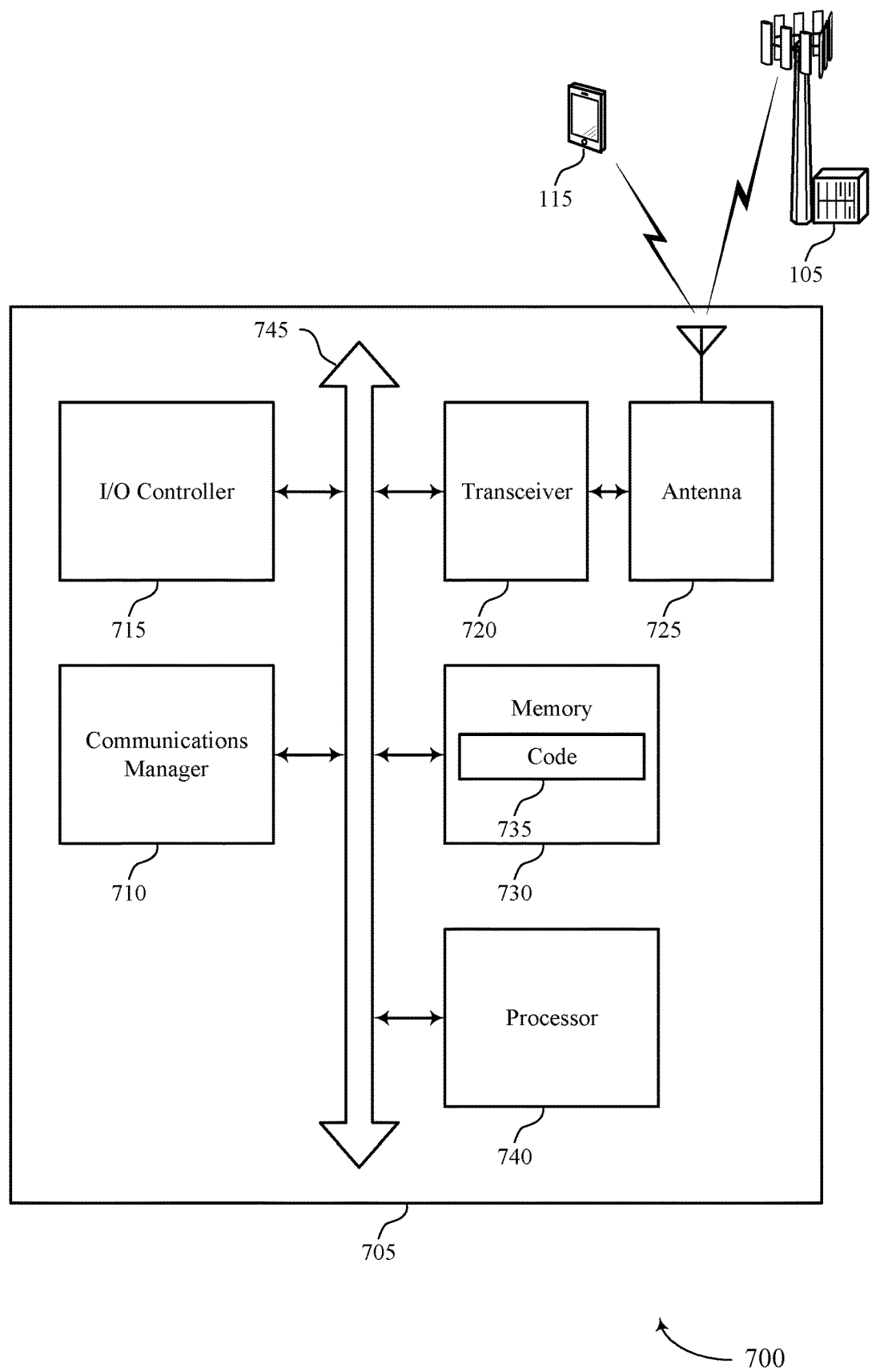
FIG. 7 shows a diagram of a system including a device that supports techniques for sidelink preemption indications in wireless communications systems in accordance with aspects of the present disclosure.

FIG. 7 shows a diagram of a system 700 including a device 705 that supports techniques for sidelink preemption indications in wireless communications systems in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, control signaling indicating a set of resources of a sidelink channel available for sidelink communication with a second UE, receive a sidelink preemption indication indicating that at least a first resource from the set of resources is preempted, and communicate a sidelink transmission over the sidelink channel with the second UE based on the sidelink preemption indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for sidelink preemption indications in wireless communications systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
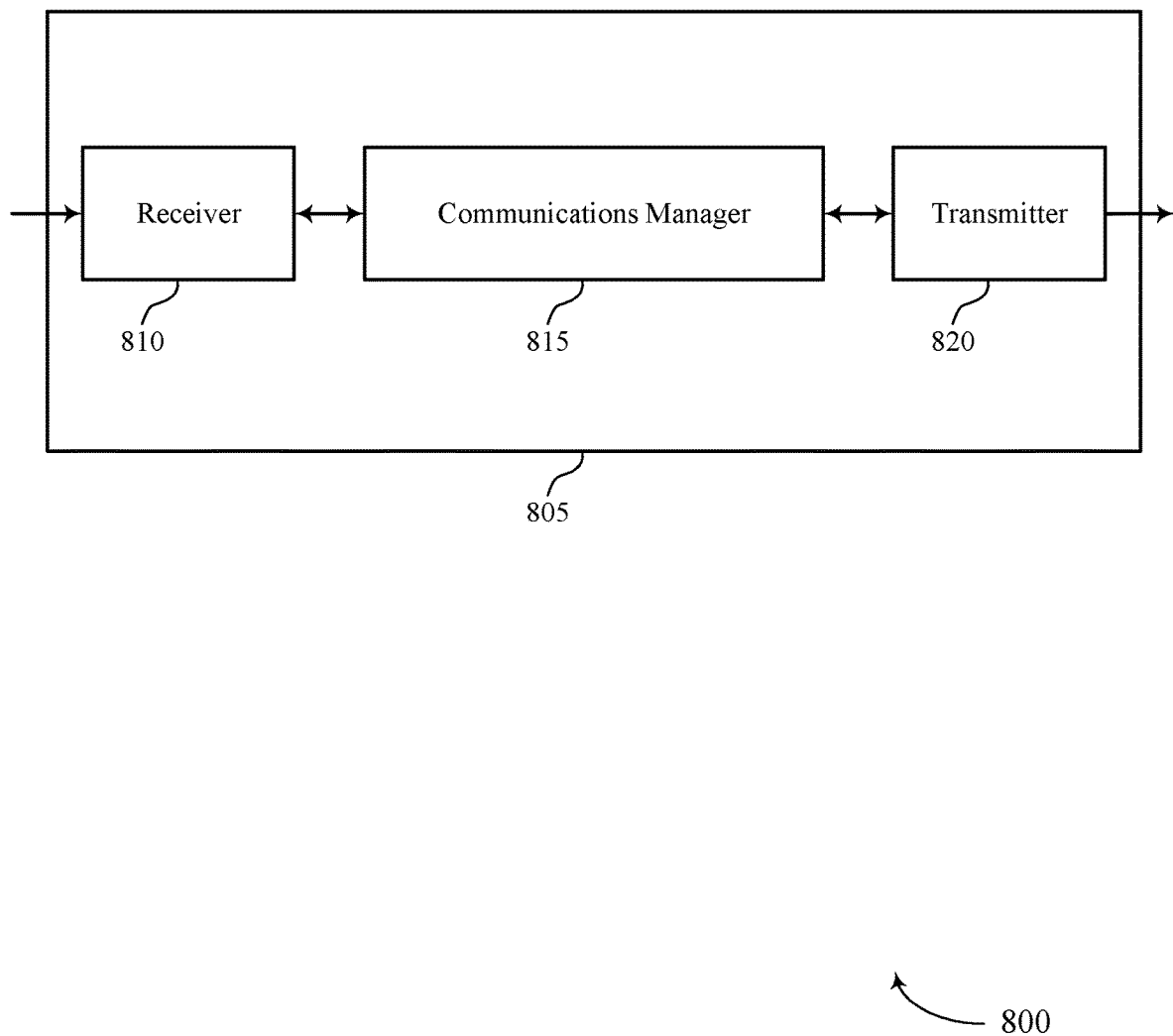
FIGS. 8 and 9 show block diagrams of devices that support techniques for sidelink preemption indications in wireless communications systems in accordance with aspects of the present disclosure.

FIG. 8 shows a block diagram 800 of a device 805 that supports techniques for sidelink preemption indications in wireless communications systems in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for sidelink preemption indications in wireless communications systems, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a first UE, control signaling indicating a set of resources of a sidelink channel available for sidelink communication with a second UE, determine to preempt a first resource from the set of resources, and transmit, to the first UE, a sidelink preemption indication indicating the first resource is preempted. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
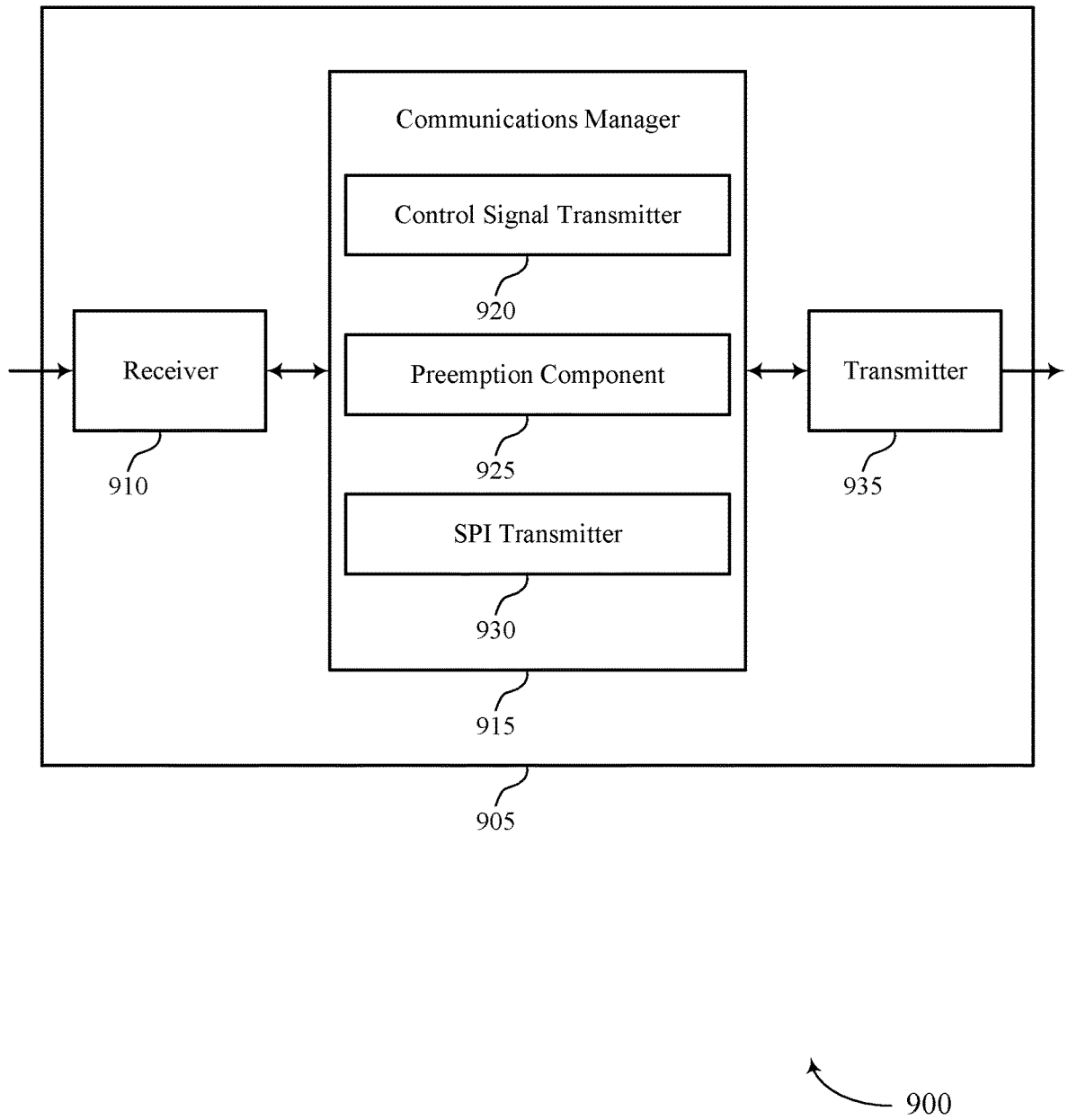

FIG. 9 shows a block diagram 900 of a device 905 that supports techniques for sidelink preemption indications in wireless communications systems in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for sidelink preemption indications in wireless communications systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control signal transmitter 920, a preemption component 925, and a SPI transmitter 930. The communications manager 915 may be an example of aspects of the communications manager 1110 described herein.

The control signal transmitter 920 may transmit, to a first UE, control signaling indicating a set of resources of a sidelink channel available for sidelink communication with a second UE.

The preemption component 925 may determine to preempt a first resource from the set of resources.

The SPI transmitter 930 may transmit, to the first UE, a sidelink preemption indication indicating the first resource is preempted.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
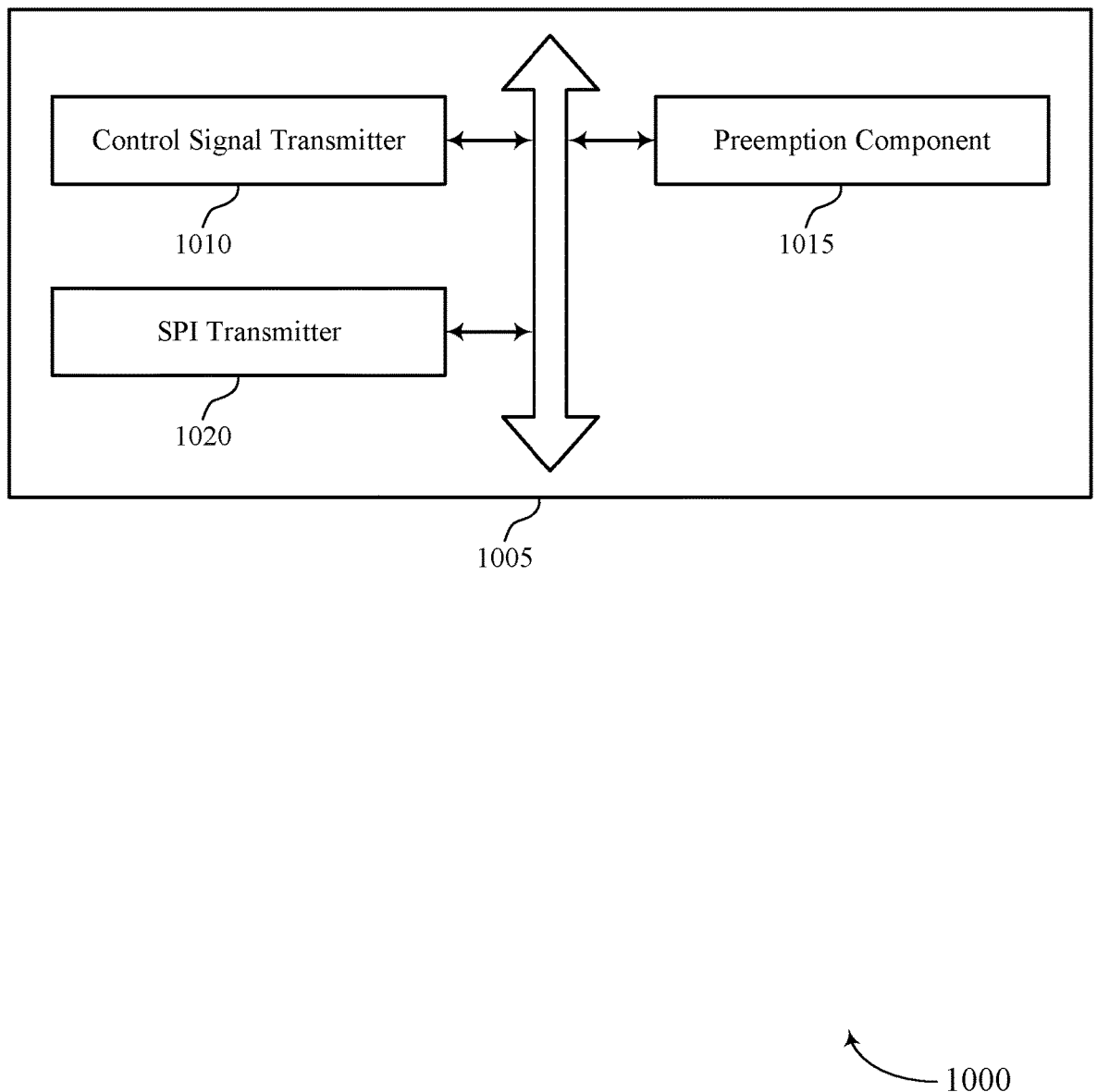
FIG. 10 shows a block diagram of a communications manager that supports techniques for sidelink preemption indications in wireless communications systems in accordance with aspects of the present disclosure.

FIG. 10 shows a block diagram 1000 of a communications manager 1005 that supports techniques for sidelink preemption indications in wireless communications systems in accordance with aspects of the present disclosure. The communications manager 1005 may be an example of aspects of a communications manager 815, a communications manager 915, or a communications manager 1110 described herein. The communications manager 1005 may include a control signal transmitter 1010, a preemption component 1015, and a SPI transmitter 1020. Each of these modules may communicate, directly or indirectly, with one another (e.g., via one or more buses).

The control signal transmitter 1010 may transmit, to a first UE, control signaling indicating a set of resources of a sidelink channel available for sidelink communication with a second UE.

The preemption component 1015 may determine to preempt a first resource from the set of resources.

The SPI transmitter 1020 may transmit, to the first UE, a sidelink preemption indication indicating the first resource is preempted. In some examples, the SPI transmitter 1020 may transmit the sidelink preemption indication that indicates a priority threshold. In some examples, the SPI transmitter 1020 may transmit the sidelink preemption indication that indicates a zone identifier. In some examples, the SPI transmitter 1020 may transmit the sidelink preemption indication that indicates a reference signal received power threshold. In some examples, the SPI transmitter 1020 may transmit the sidelink preemption indication that indicates a periodicity. In some examples, the SPI transmitter 1020 may transmit the sidelink preemption indication that indicates a resource pool identifier. In some examples, the SPI transmitter 1020 may transmit the sidelink preemption indication that indicates a cast type.

Figure 11:
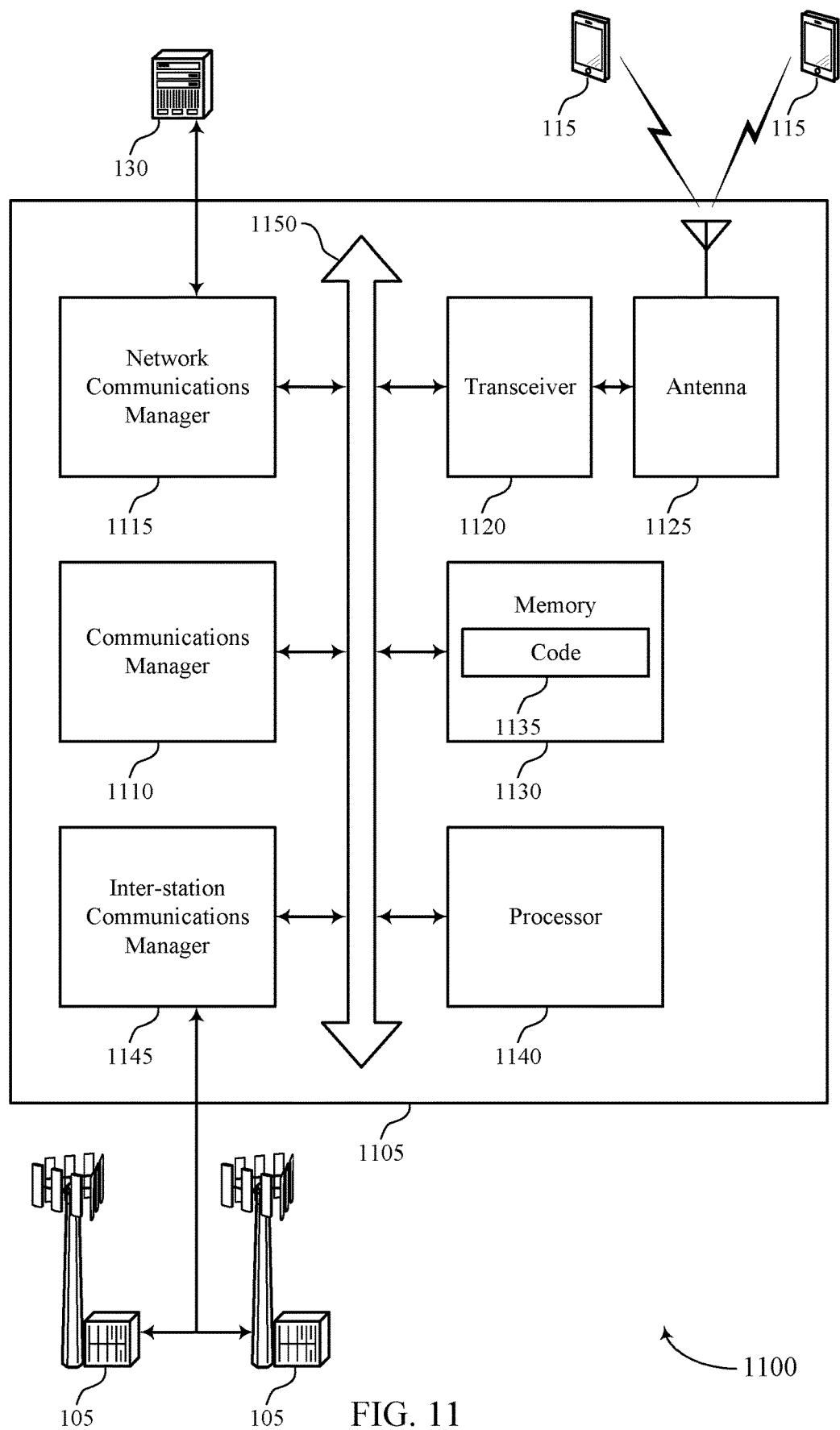
FIG. 11 shows a diagram of a system including a device that supports techniques for sidelink preemption indications in wireless communications systems in accordance with aspects of the present disclosure.

FIG. 11 shows a diagram of a system 1100 including a device 1105 that supports techniques for sidelink preemption indications in wireless communications systems in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit, to a first UE, control signaling indicating a set of resources of a sidelink channel available for sidelink communication with a second UE, determine to preempt a first resource from the set of resources, and transmit, to the first UE, a sidelink preemption indication indicating the first resource is preempted.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for sidelink preemption indications in wireless communications systems).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
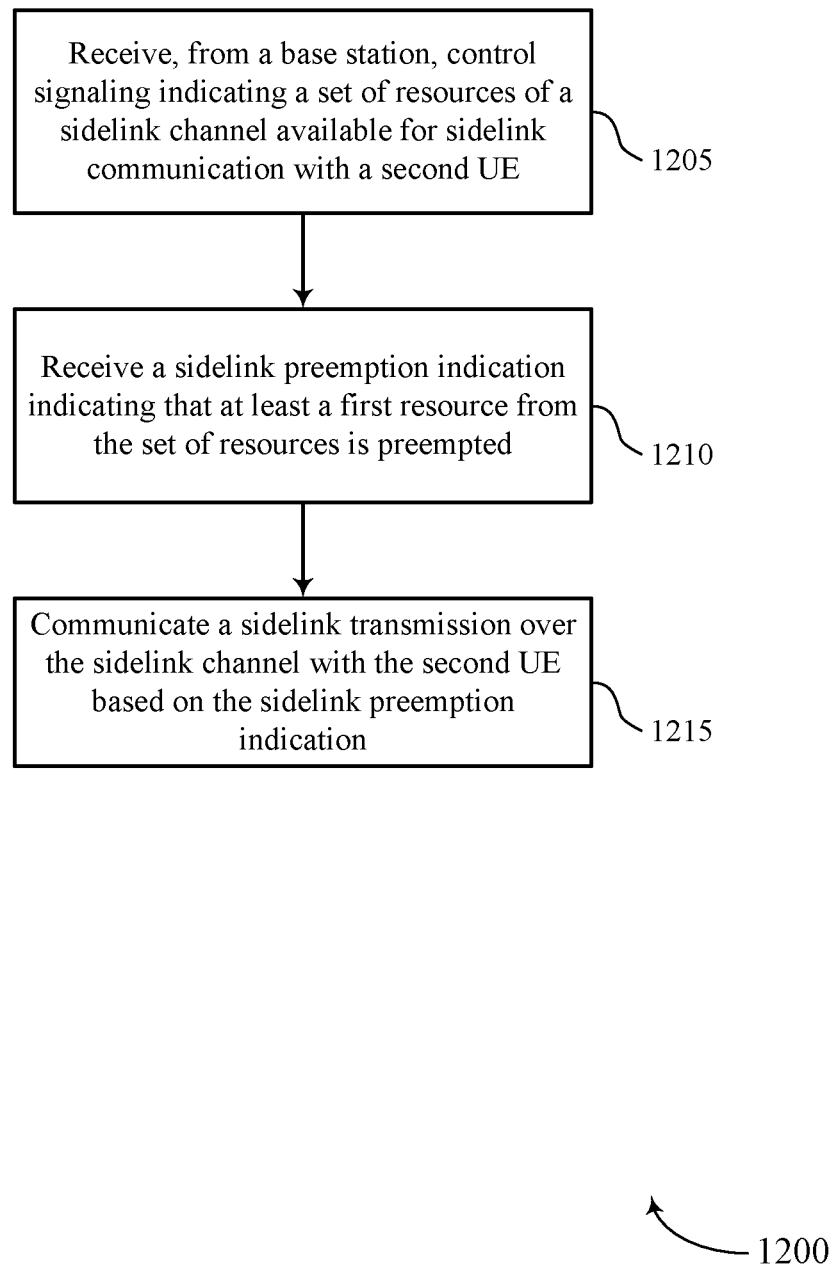
FIGS. 12 through 14 show flowcharts illustrating methods that support techniques for sidelink preemption indications in wireless communications systems in accordance with aspects of the present disclosure.

FIG. 12 shows a flowchart illustrating a method 1200 that supports techniques for sidelink preemption indications in wireless communications systems in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, control signaling indicating a set of resources of a sidelink channel available for sidelink communication with a second UE. The operations of 1205 may be performed according to the methods described herein. In some examples, aspects of the operations of 1205 may be performed by a control signal receiver as described with reference to FIGS. 4 through 7.

At 1210, the UE may receive a sidelink preemption indication indicating that at least a first resource from the set of resources is preempted. The operations of 1210 may be performed according to the methods described herein. In some examples, aspects of the operations of 1210 may be performed by a SPI component as described with reference to FIGS. 4 through 7.

At 1215, the UE may communicate a sidelink transmission over the sidelink channel with the second UE based on the sidelink preemption indication. The operations of 1215 may be performed according to the methods described herein. In some examples, aspects of the operations of 1215 may be performed by a sidelink transmission component as described with reference to FIGS. 4 through 7.

Figure 13:
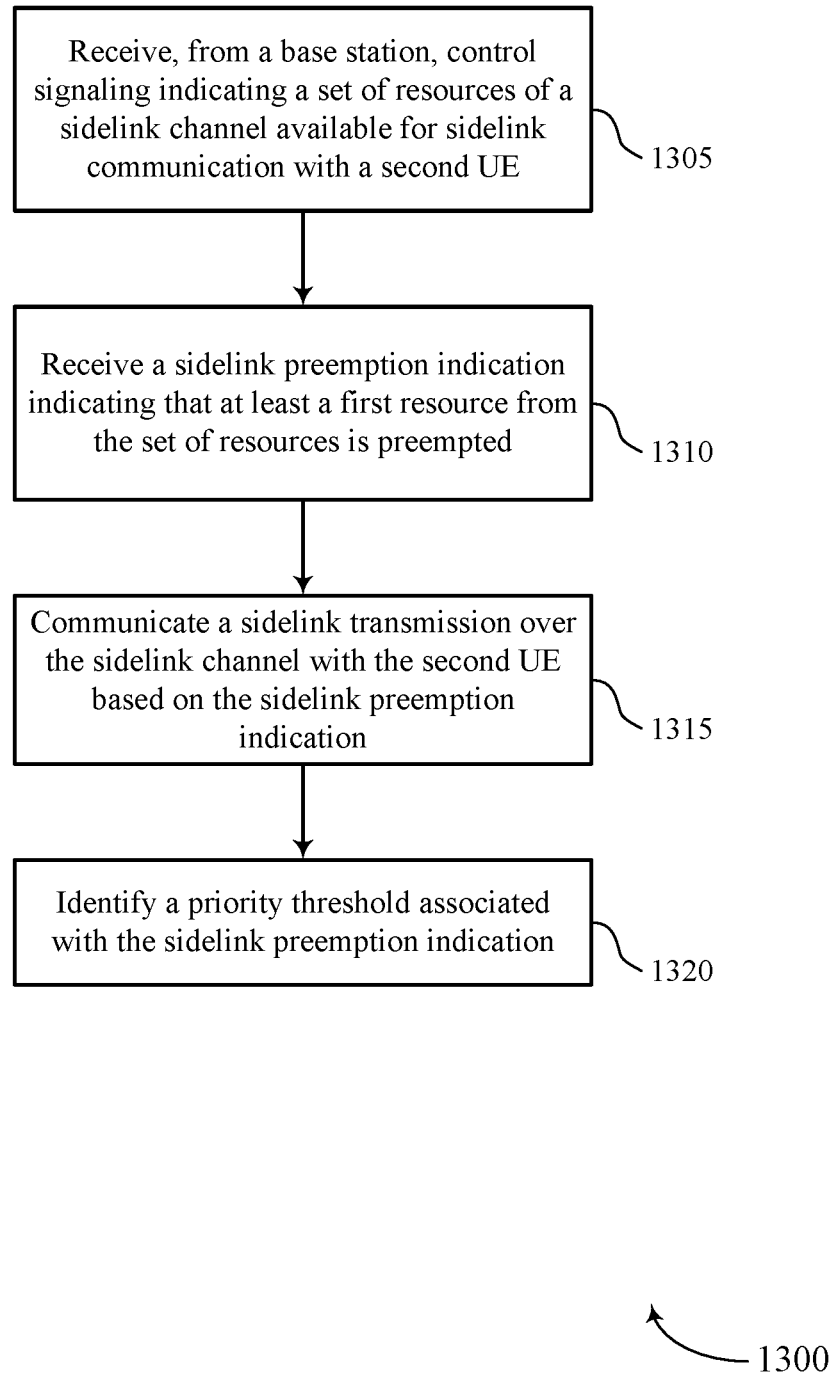

FIG. 13 shows a flowchart illustrating a method 1300 that supports techniques for sidelink preemption indications in wireless communications systems in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, control signaling indicating a set of resources of a sidelink channel available for sidelink communication with a second UE. The operations of 1305 may be performed according to the methods described herein. In some examples, aspects of the operations of 1305 may be performed by a control signal receiver as described with reference to FIGS. 4 through 7.

At 1310, the UE may receive a sidelink preemption indication indicating that at least a first resource from the set of resources is preempted. The operations of 1310 may be performed according to the methods described herein. In some examples, aspects of the operations of 1310 may be performed by a SPI component as described with reference to FIGS. 4 through 7.

At 1315, the UE may communicate a sidelink transmission over the sidelink channel with the second UE based on the sidelink preemption indication. The operations of 1315 may be performed according to the methods described herein. In some examples, aspects of the operations of 1315 may be performed by a sidelink transmission component as described with reference to FIGS. 4 through 7.

At 1320, the UE may identify a priority threshold associated with the sidelink preemption indication. The operations of 1320 may be performed according to the methods described herein. In some examples, aspects of the operations of 1320 may be performed by a priority component as described with reference to FIGS. 4 through 7.

Figure 14:
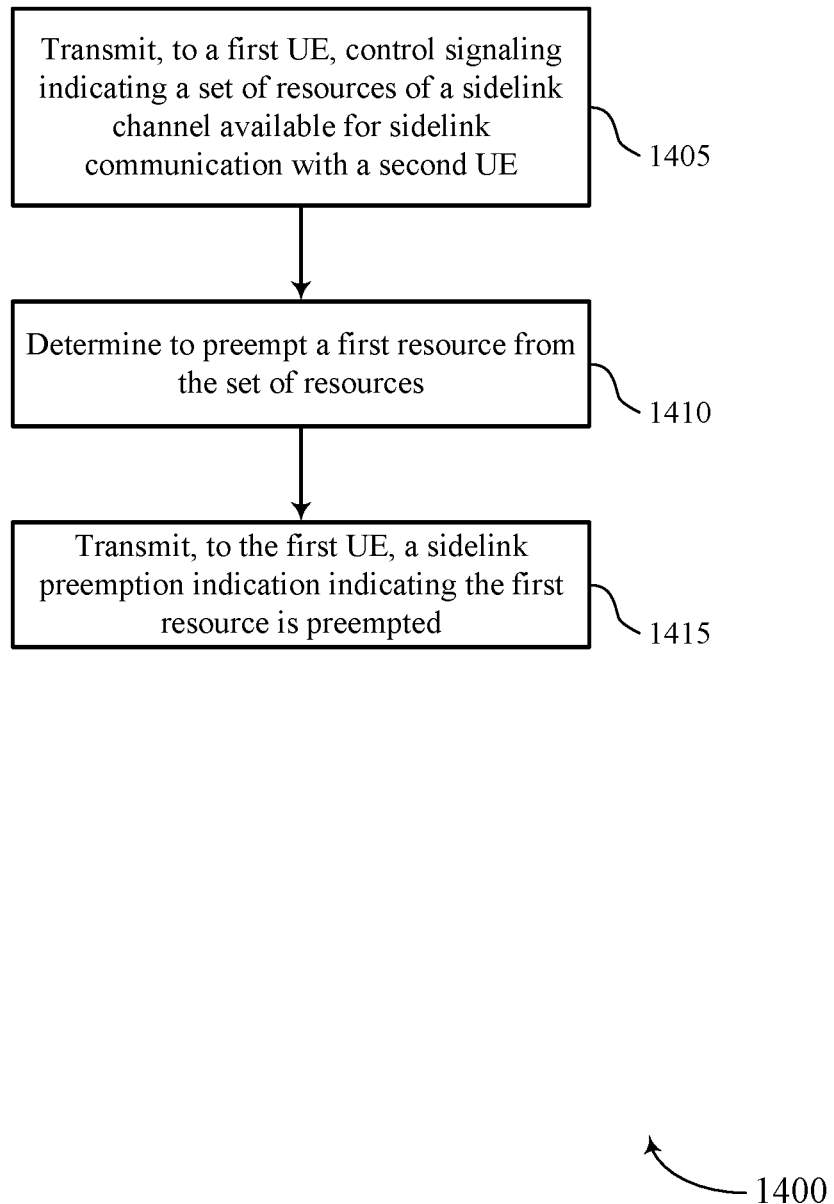

FIG. 14 shows a flowchart illustrating a method 1400 that supports techniques for sidelink preemption indications in wireless communications systems in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit, to a first UE, control signaling indicating a set of resources of a sidelink channel available for sidelink communication with a second UE. The operations of 1405 may be performed according to the methods described herein. In some examples, aspects of the operations of 1405 may be performed by a control signal transmitter as described with reference to FIGS. 8 through 11.

At 1410, the base station may determine to preempt a first resource from the set of resources. The operations of 1410 may be performed according to the methods described herein. In some examples, aspects of the operations of 1410 may be performed by a preemption component as described with reference to FIGS. 8 through 11.

At 1415, the base station may transmit, to the first UE, a sidelink preemption indication indicating the first resource is preempted. The operations of 1415 may be performed according to the methods described herein. In some examples, aspects of the operations of 1415 may be performed by a SPI transmitter as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communication at a first user equipment (UE), comprising: receiving, from a base station, control signaling indicating a set of resources of a sidelink channel available for sidelink communication with a second UE; receiving a sidelink preemption indication indicating that at least a first resource from the set of resources is preempted; and communicating a sidelink transmission over the sidelink channel with the second UE based at least in part on the sidelink preemption indication.

Example 2: The method of 1, further comprising: identifying a priority threshold associated with the sidelink preemption indication.

Example 3: The method of any one of examples 1 through 2, further comprising: determining that a priority of the sidelink transmission satisfies the priority threshold, wherein communicating the sidelink transmission over the sidelink channel is based at least in part on the priority of the sidelink transmission satisfying the priority threshold.

Example 4: The method of any one of examples 1 through 3, further comprising: receiving the sidelink preemption indication that indicates the priority threshold.

Example 5: The method of any one of examples 1 through 4, wherein the priority threshold is configured at the UE for a carrier or a resource pool including the set of resources.

Example 6: The method of any one of examples 1 through 5, wherein the priority threshold is configured by a common configuration for a carrier or a resource pool including the set of resources, the common configuration associated with a plurality of UEs that are active on the carrier or the resource pool.

Example 7: The method of any one of examples 1 through 6, further comprising: identifying a reference signal received power measurement based at least in part on receiving the sidelink preemption indication; and determining that the reference signal received power measurement satisfies a threshold, wherein communicating the sidelink transmission over the sidelink channel is based at least in part on the reference signal received power measurement satisfying the threshold.

Example 8: The method of any one of examples 1 through 7, further comprising: receiving the sidelink preemption indication that indicates the threshold.

Example 9: The method of any one of examples 1 through 8, further comprising: identifying the threshold based on a priority of the sidelink transmission, the priority of the sidelink transmission indicated by the sidelink preemption indication.

Example 10: The method of any one of examples 1 through 9, further comprising: receiving the sidelink preemption indication that indicates a zone identifier, a resource pool identifier, a carrier identifier, a periodicity of preemption, a cast type, or any combination thereof.

Example 11: The method of any one of examples 1 through 10, further comprising: receiving the sidelink preemption indication periodically or a-periodically.

Example 12: The method of any one of examples 1 through 11, further comprising: receiving the sidelink preemption indication that corresponds to a first resource pool or a plurality of resource pools, the first resource pool or the plurality of resource pools comprising the set of resources.

Example 13: The method of any one of examples 1 through 12, further comprising: monitoring a second set of resources for the sidelink preemption indication, wherein receiving the sidelink preemption indication is based at least in part on the monitoring, the second set of resources comprising different resources than the set of resources or a subset of the set of resources.

Example 14: The method of any one of examples 1 through 13, further comprising: receiving the sidelink preemption indication that corresponds to a first serving cell, or a set of serving cells including the first serving cell.

Example 15: The method of any one of examples 1 through 14, further comprising: receiving an indication that the sidelink preemption indication corresponds to the first serving cell or the set of serving cells.

Example 16: A method for wireless communication at a base station, comprising: transmitting, to a first user equipment (UE), control signaling indicating a set of resources of a sidelink channel available for sidelink communication with a second UE; determining to preempt a first resource from the set of resources; and transmitting, to the first user equipment (UE), a sidelink preemption indication indicating the first resource is preempted.

Example 17: The method of example 16, wherein transmitting the sidelink preemption indication comprises: transmitting the sidelink preemption indication that indicates a priority threshold.

Example 18: The method of examples 16 or 17, further comprising: transmitting the sidelink preemption indication that indicates a zone identifier.

Example 19: The method of any one of examples 16 through 18, further comprising: transmitting the sidelink preemption indication that indicates a reference signal received power threshold.

Example 20: The method of any one of examples 16 through 19, further comprising: transmitting the sidelink preemption indication that indicates a periodicity.

Example 21: The method of any one of examples 16 through 20, further comprising: transmitting the sidelink preemption indication that indicates a resource pool identifier.

Example 22: The method of any one of examples 16 through 21, further comprising: transmitting the sidelink preemption indication that indicates a cast type.

Example 23: An apparatus for wireless communication at a first user equipment (UE) comprising at least one means for performing a method of any one of examples 1 through 15.

Example 24: An apparatus for wireless communication at a first user equipment (UE) comprising a processor; memory in electronic communication with the processor; and instructions stored in the memory and executable by the processor to cause the apparatus to perform a method of any one of examples 1 through 15.

Example 25: A non-transitory computer-readable medium storing code for wireless communication at a first user equipment (UE) the code comprising instructions executable by a processor to perform a method of any one of examples 1 through 15.

Example 26: An apparatus for wireless communication at a base station comprising at least one means for performing a method of any one of examples 16 through 22.

Example 27: An apparatus for wireless communication at a base station comprising a processor; memory in electronic communication with the processor; and instructions stored in the memory and executable by the processor to cause the apparatus to perform a method of any one of examples 16 through 22.

Example 28: A non-transitory computer-readable medium storing code for wireless communication at a base station the code comprising instructions executable by a processor to perform a method of any one of examples 16 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    receiving, from a network device, control signaling indicating a first set of resources of a sidelink channel available for sidelink communication with a second UE, wherein the first set of resources is shared with an access link available for uplink or downlink communication with the network device;
    monitoring a second set of resources for a sidelink preemption indication, the second set of resources comprising resources that are dedicated to preemption indication signaling;
    receiving, from the network device, the sidelink preemption indication indicating that at least a first resource from the first set of resources is preempted for communications on the sidelink channel or the access link based at least in part on a collision between first communications scheduled for the access link and second communications scheduled for the sidelink channel, wherein the sidelink preemption indication further indicates a reference signal received power threshold associated with the sidelink preemption indication, and wherein receiving the sidelink preemption indication is based at least in part on the monitoring; and
    communicating a sidelink transmission via the sidelink channel with the second UE based at least in part on the sidelink preemption indication and in accordance with a reference signal received power measurement of the sidelink preemption indication satisfying the reference signal received power threshold.

2. The method of claim 1, further comprising:
    identifying a priority threshold associated with the sidelink preemption indication.

3. The method of claim 2, further comprising:
    determining that a priority of the sidelink transmission satisfies the priority threshold, wherein communicating the sidelink transmission via the sidelink channel is based at least in part on the priority of the sidelink transmission satisfying the priority threshold.

4. The method of claim 2, further comprising:
    receiving the sidelink preemption indication that indicates the priority threshold.

5. The method of claim 2, wherein the priority threshold is configured at the first UE, the second UE, or both, for a carrier or a resource pool including the first set of resources.

6. The method of claim 2, wherein the priority threshold is configured by a common configuration for a carrier or a resource pool including the first set of resources, the common configuration associated with a plurality of UEs that are active on the carrier or the resource pool.

7. The method of claim 1, further comprising:
    measuring the sidelink preemption indication to identify the reference signal received power measurement based at least in part on receiving the sidelink preemption indication; and
    determining that the reference signal received power measurement satisfies the reference signal received power threshold based at least in part on measuring the sidelink preemption indication.

8. The method of claim 7, further comprising:
    identifying the reference signal received power threshold based on a priority of the sidelink transmission, the priority of the sidelink transmission indicated by the sidelink preemption indication.

9. The method of claim 1, further comprising:
    receiving the sidelink preemption indication that indicates a zone identifier, a resource pool identifier, a carrier identifier, a periodicity of preemption, a cast type, or any combination thereof.

10. The method of claim 1, further comprising:
    receiving the sidelink preemption indication periodically or a-periodically.

11. The method of claim 1, further comprising:
    receiving the sidelink preemption indication that corresponds to a first resource pool or a plurality of resource pools, the first resource pool or the plurality of resource pools comprising the first set of resources.

12. The method of claim 1, further comprising:
    receiving the sidelink preemption indication that corresponds to a first serving cell, or a set of serving cells including the first serving cell.

13. The method of claim 12, further comprising:
    receiving signaling comprising an indication that the sidelink preemption indication corresponds to the first serving cell or the set of serving cells.

14. A method for wireless communication at a network device, comprising:
    transmitting, to a first user equipment (UE), control signaling indicating a first set of resources of a sidelink channel available for sidelink communication with a second UE, wherein the first set of resources is shared with an access link available for uplink or downlink communication with the network device;

determining to preempt a first resource from the first set of resources for communications on the sidelink channel or the access link based at least in part on a collision between first communications scheduled for the access link and second communications scheduled for the sidelink channel; and transmitting, to the first UE, a sidelink preemption indication indicating the first resource is preempted, wherein the sidelink preemption indication is transmitted via a second set of resources comprising resources that are dedicated to preemption indication signaling, wherein the sidelink preemption indication further indicates a reference signal received power threshold, and wherein an application of the sidelink preemption indication is based on a reference signal received power measurement of the sidelink preemption indication satisfying the reference signal received power threshold.

15. The method of claim 14, wherein transmitting the sidelink preemption indication comprises:
transmitting the sidelink preemption indication that indicates a priority threshold.

16. The method of claim 14, further comprising:
transmitting the sidelink preemption indication that indicates a zone identifier.

17. The method of claim 14, further comprising:
transmitting the sidelink preemption indication that indicates a periodicity.

18. The method of claim 14, further comprising:
transmitting the sidelink preemption indication that indicates a resource pool identifier.

19. The method of claim 14, further comprising:
transmitting the sidelink preemption indication that indicates a cast type.

20. The method of claim 14, further comprising:
transmitting the sidelink preemption indication periodically or a-periodically.

21. An apparatus for wireless communication at a first user equipment (UE), comprising:
one or more memories; and
one or more processors coupled with the one or more memories and configured to cause the first UE to:
receive, from a network device, control signaling indicating a first set of resources of a sidelink channel available for sidelink communication with a second UE, wherein the first set of resources is shared with an access link available for uplink or downlink communication with the network device;
monitor a second set of resources for a sidelink preemption indication, the second set of resources comprising resources that are dedicated to preemption indication signaling;
receive, from the network device, the sidelink preemption indication indicating that at least a first resource from the first set of resources is preempted for communications on the sidelink channel or the access link based at least in part on a collision between first communications scheduled for the access link and second communications scheduled for the sidelink channel, wherein the sidelink preemption indication further indicates a reference signal received power threshold associated with the sidelink preemption indication, and wherein receiving the sidelink preemption indication is based at least in part on the monitoring; and
communicate a sidelink transmission via the sidelink channel with the second UE based at least in part on the sidelink preemption indication in accordance with a reference signal received power measurement of the sidelink preemption indication satisfying the reference signal received power threshold.

22. The apparatus of claim 21, wherein the one or more processors are further configured to cause the first UE to:
identify a priority threshold associated with the sidelink preemption indication.

23. The apparatus of claim 22, wherein the one or more processors are further configured to cause the first UE to:
determine that a priority of the sidelink transmission satisfies the priority threshold, wherein communicating the sidelink transmission via the sidelink channel is based at least in part on the priority of the sidelink transmission satisfying the priority threshold.

24. The apparatus of claim 22, wherein the one or more processors are further configured to cause the first UE to:
receive the sidelink preemption indication that indicates the priority threshold.

25. An apparatus for wireless communication at a network device, comprising:
one or more memories; and
one or more processors coupled with the one or more memories and configured to cause the network device to:
transmit, to a first user equipment (UE), control signaling indicating a first set of resources of a sidelink channel available for sidelink communication with a second UE, wherein the first set of resources is shared with an access link available for uplink or downlink communication with the network device;
determine to preempt a first resource from the first set of resources for communication on the sidelink channel or the access link based at least in part on a collision between first communications scheduled for the access link and second communications scheduled for the sidelink channel; and
transmit, to the first UE, a sidelink preemption indication indicating the first resource is preempted, wherein the sidelink preemption indication is transmitted via a second set of resources comprising resources that are dedicated to preemption indication signaling, wherein the sidelink preemption indication further indicates a reference signal received power threshold, and wherein an application of the sidelink preemption indication is based on a reference signal received power measurement of the sidelink preemption indication satisfying the reference signal received power threshold.

26. The apparatus of claim 25, wherein, to transmit the sidelink preemption indication, the one or more processors are configured to cause the network device to:
transmit the sidelink preemption indication that indicates a priority threshold.

27. The apparatus of claim 25, wherein the one or more processors are further configured to cause the network device to:
transmit the sidelink preemption indication that indicates a zone identifier.

* * * * *